March 29, 1938.   A. H. GAESS   2,112,284
METHOD AND APPARATUS FOR FORMING METAL ARTICLES
Filed July 15, 1936   4 Sheets-Sheet 3
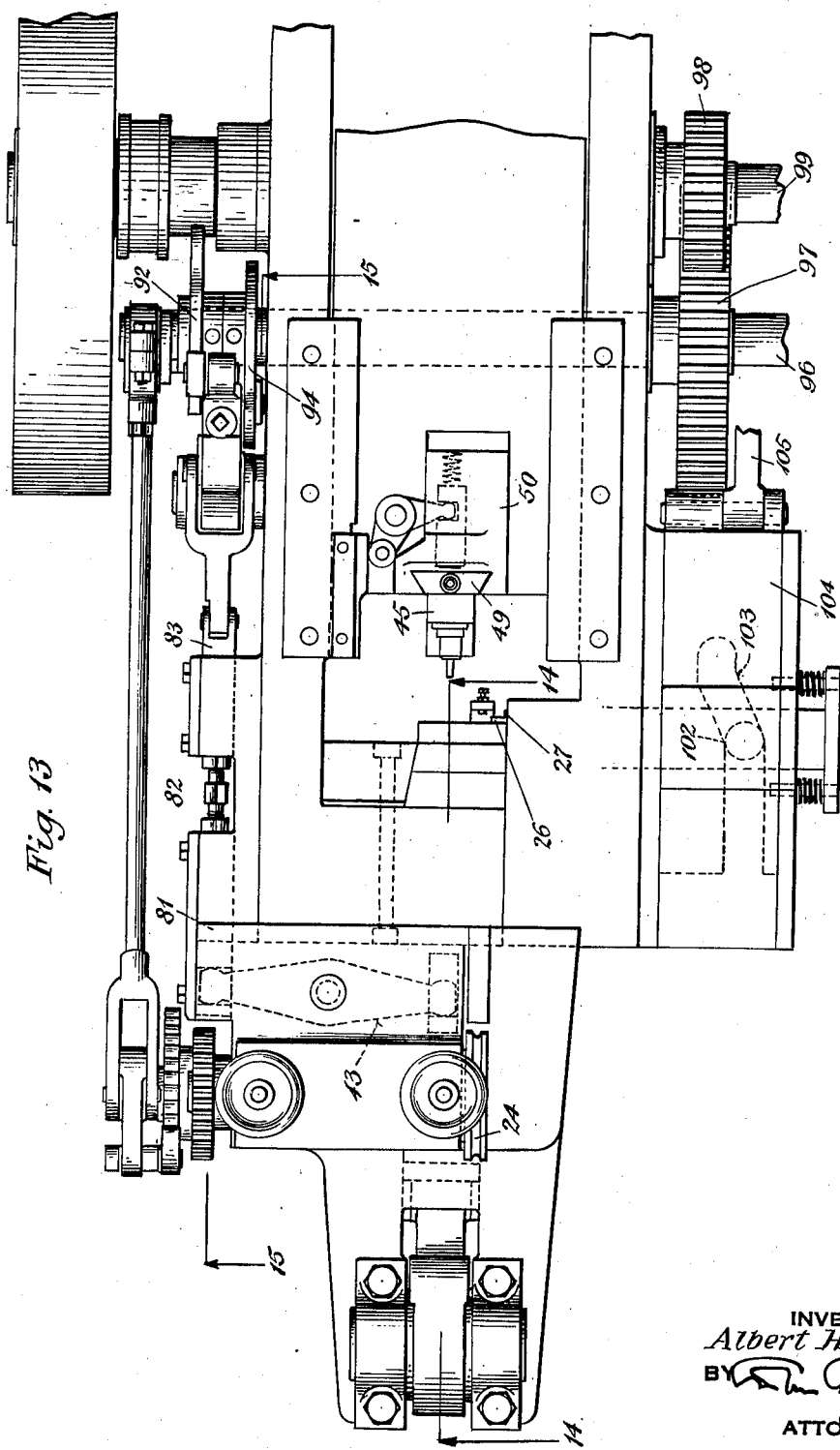
INVENTOR
Albert H. Gaess,
BY 
ATTORNEY

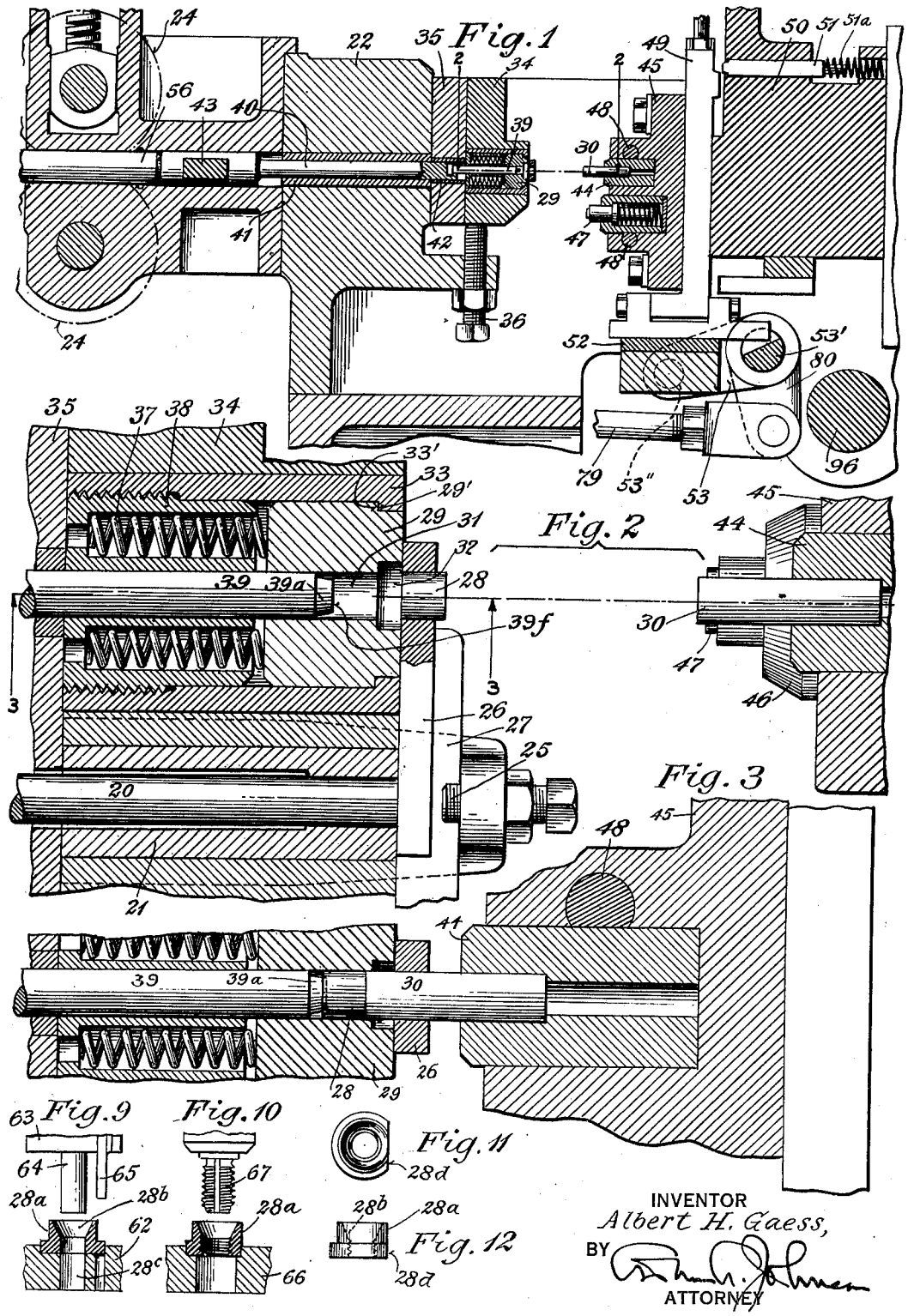

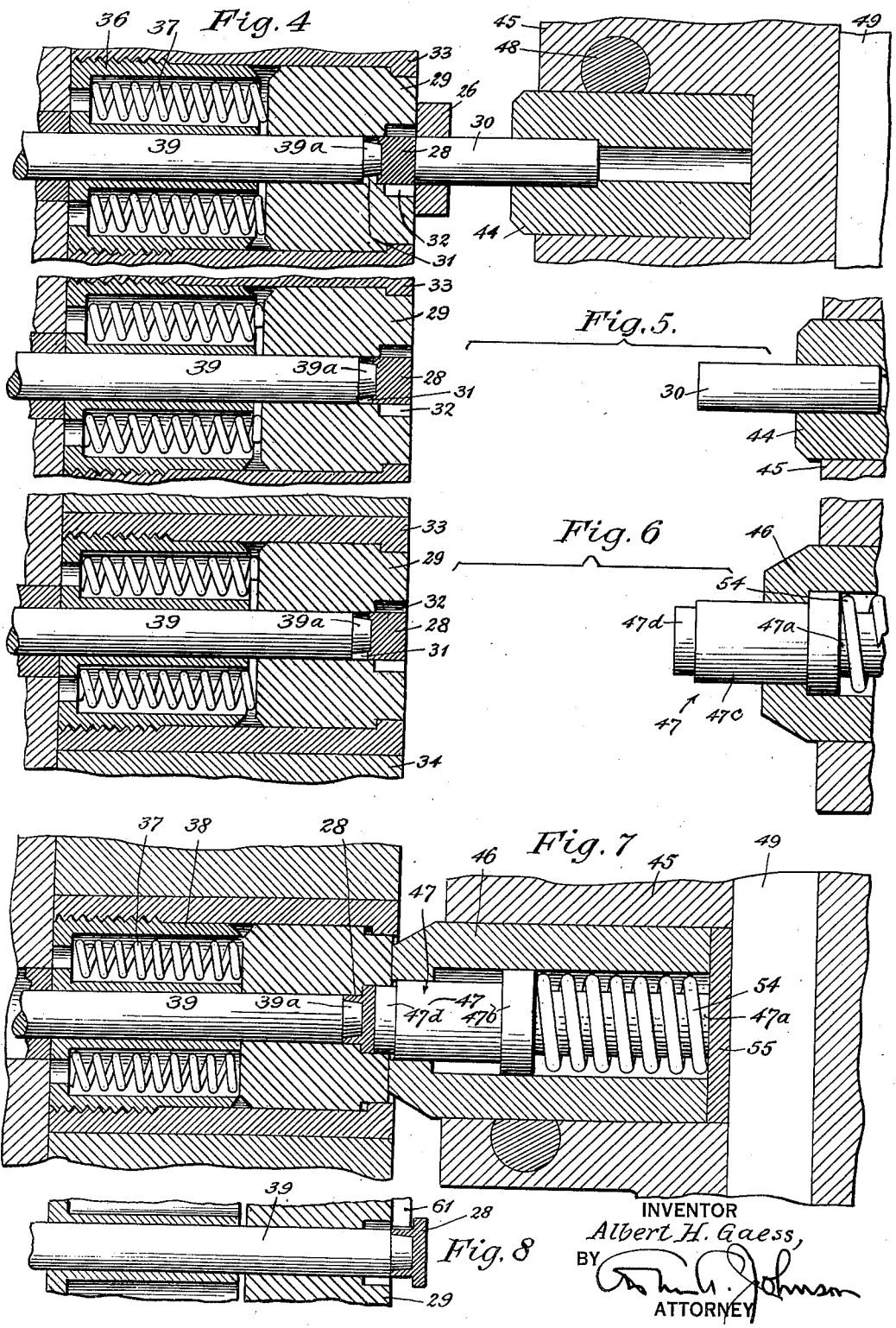

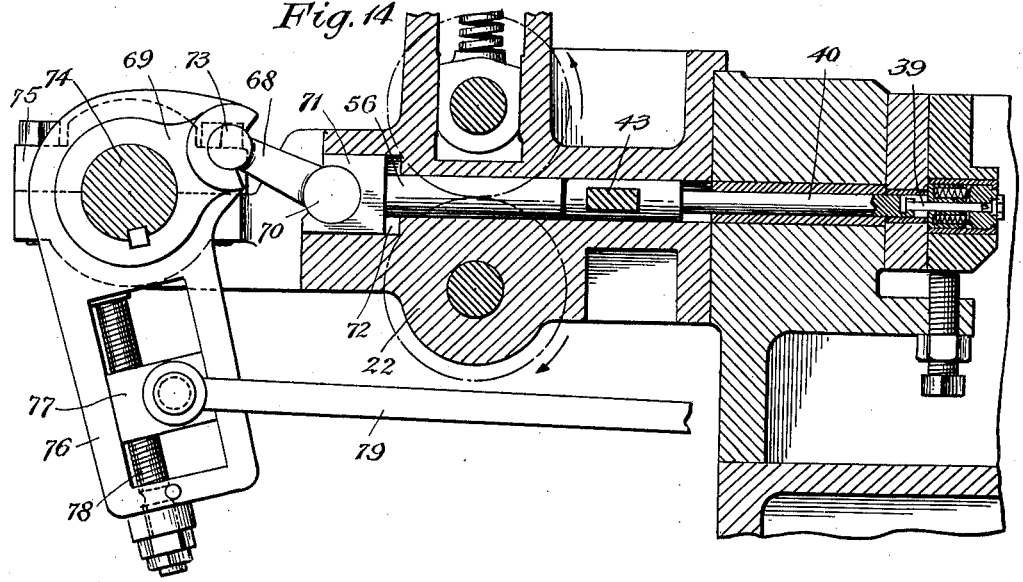
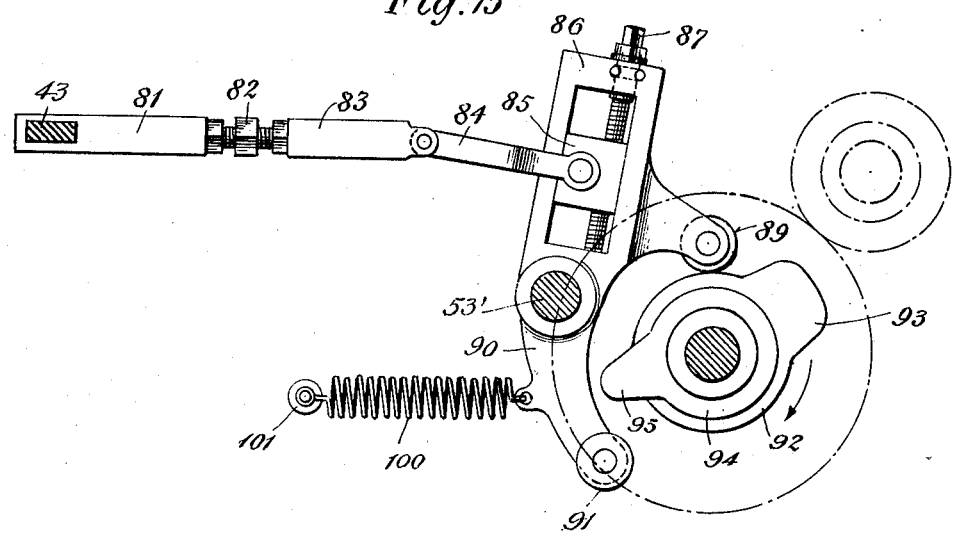

Patented Mar. 29, 1938

2,112,284

UNITED STATES PATENT OFFICE 2,112,284

METHOD AND APPARATUS FOR FORMING METAL ARTICLES

Albert H. Gaess, Waterbury, Conn.

Application July 15, 1936, Serial No. 90,644

24 Claims. (Cl. 10—12)

This invention relates to metal working.

The general aim of the invention is to provide an improved method and mechanism for manufacturing metallic forms from metal stock by cold working of the metal.

One of the objects of this invention is to provide an improved method and apparatus for fabricating clincher nuts.

A feature of the present invention is the making of a clincher nut blank from a metal blank or slug, by the use of a forming die, and by a method which involves inserting the slug into a forming cavity of the die shaped to receive said slug slidably, by compressing the slug endwisely thereof, by moving the slug endwisely through the die cavity to protrude an end portion of the slug beyond said cavity, and by heading over said protruded end portion of the slug and simultaneously relatively moving the die-head, slug, and a tubulating tool to draw a tubulation on the end of the slug opposite to its end being headed.

Another feature of the present invention is the making of a clincher nut by a method which involves producing a clincher nut blank substantially as just above described, and once so produced that its tubulation aforesaid diminishes in cross-sectional area in the direction of depth of the tubulation lengthwisely of the slug, as, for instance by being made conical, then chopping off a portion of the head to incorporate a keying element, as for instance, to transform a circular head into a D-head, while punching a tappable hole through the plug in extension of said tubulation and preferably coaxial therewith, and finally threading said hole.

When clincher nuts are being manufactured by the present invention, the head can be made cylindrical, polygonal or otherwise as appropriate or desired. When, as is now preferred, these nuts are to be of the same type as now extensively produced by the use of a screw-cutting machine from D-bar metal stock to provide a D-head the circular part of the periphery of which is substantially concentric with the axis of the nut shank, and yet the slug from which the nut is produced is a cut-off length of cylindrical rod or wire stock, by the heading operation aforesaid the nut head can be made completely finished except for the secant defining the staff of the D; leaving the surplus head-metal beyond the secant to be removed by the chopping operation aforesaid. As already explained, this chopping operation is performed simultaneously with a punching out of nut-metal to form a tappable hole beyond the tubulation aforesaid, and such a hole, preferably, which combines with said tubulation to effect a complete piercing of the nut axially thereof, thereby to provide a hole passing through the nut head for threading or tapping by another and final operation.

Clincher nuts are used in large quantities by manufacturers of automotive vehicles, Pullman cars, and other builders. Being self-locking nuts, due to the incorporation of such a keying or holding instrumentality as, for instance, the flat side of a D-head where that type of head is employed, they can be pulled up tightly, and without the necessity of wrench application, by rotation of the associated bolt, machine screw or the like. This advantage makes them valuable for use in blind holes or at points where wrench application would be awkward or impossible. The ordinarily employed clincher nut has at its end opposite to the headed end thereof, a flared tubulation of substantial length, to allow the nut-entering end of said bolt or screw to be guided easily toward the threaded bore of the nut which commonly passes through the nut head.

Heretofore, it has not been possible successfully to tubulate and head a slug at a single blow or by a single operation, where the tubulation is substantial. By the present invention that problem is solved by subjecting the blank or slug to two operations as aforesaid,—the first a compressive blow to expand the plug laterally to cause the die cavity to grip the slug to a sufficient extent to set up a frictional drag between the slug and the die, and the second a forming blow effective to tubulate one end of the slug to the required extent and simultaneously to head the other end of the slug to precisely the finished head shape prevised; and all, conveniently, while the slug is in a single die. I am also aware that it has been heretofore proposed to make a rivet by cold working a slug and as the result of subjecting the slug to a plurality of workings. According to this prior proposal, however, the metallic form is fabricated by completely tubulating the slug at one operation, and by wholly shaping the head at another operation, during which latter operation the end of the slug being headed is projected beyond the die and given its heading by a punch recess which only partially confines the metal being headed during the heading. The method of the present invention, however, can be carried out by the use of a single die and without the transfer of the slug from one die to another and without the confinement of one part of the slug in one die while another part thereof is confined in another die. At the same time, however, the head formed from said projected end portion of the slug is perfectly formed, without flashing or other defect, due to the fact that during the entirety of such heading the metal allotted for forming the head is confined in a forming chamber in the die.

By the present invention, again, a slug can be so tubulated, as is particularly desirable for clincher nuts, that during the tubulation the exterior of the slug opposite such tubulation is held substantially cylindrical, and the finally formed article will have a substantially cylindrical shank surrounding a tubulation which is flared.

According to the invention as now understood, the entire length of the slug should be completely confined by the wall of the die during the giving of the first or compressive blow, to prevent mushrooming or other undesirable bulging of any part of the slug. Such confinement of the entire length of the slug in the die, gives, incidentally, another advantage, which is the fact that the die can then guide the punch preferably employed to deliver said blow, and so prevent mushrooming of the end of said punch as well also as any fatiguing thereof sufficient to cause early bending. In this connection, and as will be understood from the brief description somewhat below of an apparatus now preferred to be used in carrying out the invention, in which apparatus a cutter for severing a slug from rod or wire stock and for transporting such slug to the die position is employed, such cutter for the purposes of the present invention as carried out by said apparatus, desirably remains in place in front of the die during the delivering of said compressive blow and therefore the punch-carrying member cannot be brought up very close to the die; yet the punch, although ordinarily fairly slender, is adequately protected against any likelihood of soon betraying fatigue because supported at its working end in the die during its work on the slug.

Referring now to the operation on the slug which tubulates and heads the same, this preferably is attained as the result of the striking of a second blow delivered by a different punch than that applying the first or compressive blow. This second blow is, as already stated, performed after relative movement has occurred between the slug and the die, to cause partial protrusion of the slug from the die, and preferably as the result of moving the slug endwisely along the interior of the die.

Still referring to the operation on the slug which tubulates and heads the same, said tubulation is principally if not almost quite wholly effected, directly, by a drawing of the metal at an end of the slug over a tubulating tool. That is, all or substantially all of said tubulation is effected indirectly by the delivery of the second blow by the second punch, which punch is smashed against the end of the slug opposite to the end thereof being tubulated; but directly by the drawing of the metal at the last-mentioned end of the slug over the tubulating tool while the latter is extended into the die interior. The die is preferably a compression one, that is, backed by one or more compression springs or equivalents, and so during the delivery of the second blow by the second punch said die moves back, toward the tubulating tool. The important thing is not so much to move the die back against said tool, but to move the end of the slug to be tubulated against said tool, and this last while enclosing the entire length of the slug in the die.

This result was prepared for by the first or compression blow, which laterally expanded the slug while the same was wholly confined in the die, as above explained, to cause the wall of the latter to seize the slug girthwisely with such grip that during retrograde movement of the die against its spring backing (such retrograde movement due to and accompanying the delivery of the second blow by the second punch), there is little or no relative movement between the slug and the die. Thus the friction set up between the slug and the die, as the result of the first blow on the slug, is a valuable factor in producing the tubulation by drawing the metal down over the tubulating tool, during the striking of the second blow on the slug.

With this second or tubulating blow struck by a second punch which then also heads the slug, said punch is desirably so shaped, and the die interior is correspondingly so shaped, and the parts are desirably so operated, that, during the performance of the tubulating and heading operation, the slug is not only held between the tubulating tool and said second punch, but said slug although girthwisely confined by the die over only a part of its length, is wholly housed in the die interior because said interior is closed at the outer end of the die by the outer end of the second punch. This can be accomplished by shouldering the second punch and correspondingly enlarging the mouth of the die cavity, and by arranging and timing the parts so that the head on the slug is formed incidental to movement of the second punch inwardly of the enlarged mouth of the die cavity. Because, during this heading, the slug is wholly confined within the die, flashes are prevented and surplus metal is not formed on the head, thereby eliminating a trimming operation. The head is formed by a true swaging, and not by the usual heading operation, and the metal of the head is, in some measure, densified, or, at least, compressed sufficiently to give always a perfect head.

The method of the invention can be and is preferably carried out by the aid of a conventional heading machine of the type known as a double-stroke solid-die header. For successful practice of the invention, this header can be a standard one, with several relatively simple changes. One of these would merely be that necessary to modify the single previous forward motion of the knock-out pin in such manner that this pin, to act as the tubulating tool aforesaid, will partially advance, then halt, and then complete its advance, that is, will have two positions during metal working, a fully retracted one, hereinafter called the first working position, and a partially advanced one, hereinafter called the second working position,—this tool acting as the usual knock-out pin when moved to its usual fully advanced position. Another change required would be to retime the cutter mechanism in such manner that the cutter, after transferring a cut-off slug to the die position, will stay in such position until the first punch advances to force the slug into the die and deliver the slug compressing blow and until such punch recedes from the die and clears the cutter.

As the invention would thus be carried out:

During the striking of the first blow by the first punch, to compress the slug endwisely as and for the reasons already explained, the knock-out pin remains in its fully retracted position. Since said pin acts not only as a knock-out pin but also as a forming tool, the same will hereinafter be called the knock-out tool.

Following the striking of the first blow, and during the first part of the retraction of the first punch, the knock-out tool advances from its first working position to its second working position. These operations are so conducted that during the conjoint movement of said punch and tool, the slug, interposed between them, is moved along the interior of the die in the direction of retraction of the punch. This movement is continued until, on the knock-out tool reaching its second working position, the end of the slug trailing the retracting punch is partially protruded from that part of the die interior in which the slug was girthwisely confined over its entire length during the delivery of the first or compressive blow by the first punch. The die interior, beyond the part thereof last referred to, that is, the vestibular, laterally enlarged part of the die interior which is to act as the heading cavity, is of such depth that the slug can be partially protruded thereinto, and for proper giving of the second or tubulating and heading blow, and yet not project beyond the face of the die.

As the first punch continues its retraction, for return to its normal position, following the halting of the three elements (the knock-out tool, the slug ahead of said tool, and the first punch heading of the slug) to leave said tool in its second working position, and to leave the slug in the die as last described, the cutter is withdrawn.

After the first tool has reached its normal or fully retracted position, and the head which carries both punches has ascended to shift the second punch up to aligning position with the die, the head again advances, causing the second punch to deliver the final or tubulating and heading blow.

After the second blow has been struck, and the second punch withdrawn, the knock-out tool is moved to its fully advanced position, that is, to its familiar knock-out position. Then a suitable stripper drops in place in back of the head on the finished nut blank, so that on the ensuing movement of the knock-out tool to return the same again to its fully retracted position, said blank is automatically stripped from the machine.

The invention will be more clearly understood from the following description, when taken in connection with the accompanying drawings, showing one possible apparatus in the form of a double-stroke solid-die heading machine, which constitutes a structural embodiment of the invention and one facilitative of a carrying out of the method of the invention in a way now preferred; it being understood, however, that all matter shown in the drawings, and all matter herein contained except in the appended claims, is merely illustrative and not to be taken in a limiting sense. As will be understood, these claims define the scope of protection contemplated; and said claims, of course are to be given full range of equivalents.

In the drawings:

Figure 1 is a fragmentary vertical section of the heading machine, taken substantially through the center line of the die, and showing the first punch aligned with the forming cavity of said die.

Fig. 2 is on an enlarged scale, a fragmentary horizontal section taken on the line 2—2 of Figure 1, and showing the cutter advanced to carry a slug to aligning position with the die cavity.

Fig. 3 is a fragmentary vertical section, taken on the line 3—3 of Fig. 2, but with the first punch shown at the conclusion of its advance after striking the slug an initial blow.

Fig. 4 is a view similar to Fig. 3, but showing the forming and knock-out tool advanced to its second working position, the first punch partially retracted, and the slug partially protruded into the heading cavity, and still held between said tool and punch.

Fig. 5 is a similar view, but showing the first punch fully retracted.

Fig. 6 is a similar view, but showing the second punch aligned with the die.

Fig. 7 is a similar view, showing the second punch at the conclusion of its blow-delivering stroke, and showing the nut blank as thereby completed.

Fig. 8 is a view similar to Fig. 7, but with less parts illustrated, showing the knock-out tool moved to its fully advanced position and a stripper dropped in place behind the head of the nut blank.

Fig. 9 is a fragmentary vertical section of a punch press, holding the completed nut blank, the press being operable, after the blank is transferred thereto, for piercing the latter to provide a bore through the nut head and to shear off part of the nut head to give the same a flat side; the clincher nut being here shown as already so pierced and sheared.

Fig. 10 is a view similar to Fig. 9, but showing said clincher nut after transfer to a tapping machine for finishing the article by cutting a thread in said bore; the clincher nut being here shown as already so threaded.

Fig. 11 is a top plan view of said clincher nut.

Fig. 12 is a side elevation thereof.

Fig. 13 is a top plan view of the heading machine of this invention, partially broken away.

Fig. 14 is a fragmentary vertical central section taken on the line 14—14 of Fig. 13, showing the advance mechanism for moving the forming pin of the die from retracted or first working position to intermediate or second working position.

Fig. 15 is a fragmentary vertical section on the line 15—15 of Fig. 13, showing in side elevation the cams and associated mechanism for advancing the knock-out pin for stripping, and for returning the pin to the initial first working position.

Referring to the drawings in detail, and first to Figs. 1 and 2, a length of metal rod or wire stock 20 is advanced through the machine toward the right through a guiding tube 21 carried by the die bed 34 fixed in the frame 22 of the machine; the stock 20 being thus fed by usual feed rollers 24. When the stock 20 is advanced to an extent appropriate to the determined length of the nut blank or the like to be made, such advance of the stock is halted by an adjustable stock-feed-stop 25, and a cutter 26 carried by the usual cutter slide 27 advances horizontally in the usual way and severs the thus advanced portion of the stock to provide a slug 28 and to transfer the slug into aligning position with the die 29.

As the parts are shown in Fig. 2, such transfer has been effected.

Ordinarily, the slug is held in the cutter by a resilient gripper not shown but of a type familiar in the art; so that, as soon as the slug is endwisely engaged and thrust laterally of the cutter for at least partial entry into the die, the cutter can be retracted to normal position in accordance with the usual operation of a machine of the type now being described. Here, however, as already pointed out, the operation of the cutter is so timed that following actuation thereof to transport the slug to the position shown in Fig. 2, the cutter remains as shown in this view until a first punch 30 has, in delivering its blow on the slug, ejected the slug from the cutter and into the forming cavity of the die 29, and until, following the rearrangement of the parts as in Fig. 4, the first punch has been further retracted, beyond the field of operation of the cutter.

Said forming cavity is shouldered as clearly seen in Fig. 2. For convenience, the main or smaller of these cavity subdivisions will be called the main cavity 31, and the other the heading cavity 32. Main cavity 31 is of a diameter slidably to receive the slug on ejection of the same from the cutter by the first punch 30.

The die 29 is yieldably carried in a sleeve 33 in a die carrier 34 suitably secured to and spaced from the head 22 by a block 35, and settable on the latter by the usual adjusting screw 36. An external shoulder 29' of the die 29 abuts an internal shoulder 33' of the sleeve 33, and said die is yieldingly held in this position by the tension of compression springs 37 disposed in cylindrical recesses annularly spaced around a cylindrical backing member 38 screw-threadedly connected to the rear end of sleeve 33.

The usual knock-out pin is here provided as a knock-out tool 39, since the same acts not only as a knock-out pin in the usual way, but also as a forming tool at its forward end 39a. In the present case, this metal-working end of the knock-out tool is in the form of a reduced extension of the main cylindrical portion thereof, such extension shaped as a truncated cone, to conform to the final tubulation to be given the slug by cold working of the metal thereof when such cold working is completed as shown in Fig. 7.

This knock-out tool 39 passes through a central bore in the backing member 38; said tool being secured at its inner end to a thrust rod 40, guided through sleeves 41 and 42. These parts are conventional; the thrust rod 40 being operated to send the knock-out tool 39 to knock-out or fully advanced position by a lever 43 operatively connected in the usual way to a suitably designed cam described later.

A carrier 44 for the first punch 30 is mounted on a head 45, as is also a carrier 46 for a second punch 47; these carriers being secured in place by the usual binder locks 48. Referring in this connection particularly to Fig. 1, said head 45 is carried by a lifter-slide 49; and the other parts here shown, also conventional, are a gate 50 movable toward and away from the die bed 34; a slide-lock 51 for engaging the lifter-slide in its upper position when raised to align the second punch 47 with the die cavity; a table 52 which when positioned as shown in Fig. 1 securely holds the first punch 30 in alignment with the die cavity; and a slide-shifter 53 carried on a jack shaft 53' and pivotally connected to the table at 53'' for elevating the table to place the second punch 47 in alignment with the die cavity and for returning the table to its shown position to align the first punch 30 with said cavity. As is well understood in the art, the operating means for thus vertically reciprocating the table 52, and for at the proper times moving the slide-lock 51 to the right against the tension of its spring 51a, is so arranged that the successive advances of the gate 50 toward the die bed 34 will be performed with the table 52 raised and lowered alternately.

Referring to the second punch 47 and its carrier 46, said punch as shown is a compression punch. That is, it is backed by a compression spring 54; this spring sleeving a rear reduced extension 47a of the punch, and bearing at one end against a backing plate 55 and at its other end against a peripheral enlargement or piston-portion 47b of the punch. The punch, forward of said piston-portion, comprises a main cylindrical body 47c and a reduced cylindrical terminal portion 47d of a diameter to snugly fit within the heading cavity 32 of said die.

The knock-out tool 39 of the present invention has two working positions. One of these positions corresponds to the usual fully retracted position of the ordinary knock-out pin. The other position is a partially advanced one intermediate said first working position and the usual fully advanced position of the knock-out pin. On the reaching of this last-mentioned position, the knock-out tool 39 acts as does the usual knock-out pin. The knock-out tool 39 in its fully retracted and intermediate positions is backed by a plunger 56 operated by a suitable cam-controlled toggle mechanism; and said tool is moved from its fully retracted position to its intermediate position by said mechanism or an equivalent.

Said second position of the knock-out tool 39 is shown in Figs. 5 and 6. In this position, which is that of the knock-out tool during the delivery of the second blow by the punch 47, the thrust rod 40 is backed by the same cam-controlled plunger 56 which as aforesaid backs said thrust rod in the first working position of the tool 39.

Its fully advanced position, that is, the usual advanced position of the knock-out tool, is shown in Fig. 8.

For moving the knock-out tool 39 from its fully retracted or first working position, as in Fig. 1 or 4, to its second working position, as in Fig. 5 or 6, and then for holding said tool at the position last-mentioned as required, there is provided an advance mechanism as illustrated in Fig. 14, which will be described in detail later. The means for advancing the knock-out tool 39 from its second working position to its stripping position, which latter is shown in Fig. 8, and for returning the knock-out tool to its fully retracted position, including a cam and link mechanism shown in elevation in Fig. 15, will also be described later.

The preferred way of carrying out the method of the invention, especially when that method is carried out by the aid of such a machine as that above described, and when the method is employed to make a clincher nut blank as shown at 28 in Fig. 7, is as follows:

After a slug or blank of suitable shape and length, such as the cylindrical slug 28 of Fig. 2, is placed in a die cavity, as the main cavity 31 of die 29, and of a diameter to allow the slug to be slid therein, so that such slug is housed from end to end thereof in said cavity, the slug is subjected to compression along its length, by a single blow such as would be delivered by the first punch 30, thus to expand the slug laterally and cause it to become girthwisely frictionally seized by said main die cavity. The slug will ordinarily be given, at its end adjacent the forming end of tool 39, a slight indentation or rudimentary tubulation substantially as shown in Fig. 3. There can be no premature mushrooming or other misshaping of the metal at the outer end of the slug; as at the instant the blow is struck all superficies of the slug are confined with the exception of a comparatively small annular area thereof at the inner end of the slug,—such annular area measured by the difference in diameter between the smashing face of said punch and a shoulder (marked 39f in Fig. 2) on the knock-out tool 39.

Following this first operation on the slug, the latter is moved longitudinally along the main cavity 31, until the major length of the slug is protruded beyond said main cavity and projected into the heading cavity 32; this endwise shifting of the slug in the die being accomplished by a movement of the tool 39 toward knock-out position. As shown in Fig. 4, this projection of the slug is to such an extent that only a comparatively short part of the length of the slug is retained in the grip of the main cavity 31. In order to prevent accidental loss of the slug by complete ejection thereof from said main cavity, following halting of the tool, which halting occurs when the slug is protruded from the main cavity 31 as shown in Fig. 4, the first punch, during the first part of its retraction, which retraction commences with the beginning of the advance of tool 39 from the position of Fig. 3 to that of Fig. 4, moves in timed relation to said advancement of the tool 39. Consequently, during the moving of the slug from the position in Fig. 3 to that shown in Fig. 4, the slug is held between the tool 39 and the first punch 30, and is brought to rest in the position shown in Fig. 4 before the first punch moves away from the slug to continue its retraction.

As soon as the first punch sufficiently clears away from the slug halted as just described in the position shown in Fig. 4, the cutter 26 is withdrawn.

Following full retraction of the first punch 30, a blow is given by the second punch 47; this blow completing the nut blank, by conically tubulating the same at one end, and simultaneously heading the same at the other end in such manner that a subsequent trimming operation is unnecessary.

Assisted by the frictional seizure of the main die cavity 31 on the slug, this seizure initially set up by the compressive blow delivered by the first punch 30 and later further established by the blow of the second punch, the tubulation effected by the second punch will be perfect; said friction and the retractive movement of the die causing the slug metal to be properly drawn down over the forming end of the tubulating tool upon forcing of the slug back along and over said end of said tool. It is important that such relative movement between the slug and the tool be accompanied by retrograde movement of the die, occurring during delivery of the final blow of the punch 47 in order that perfect tubulation of the slug be effected.

Also, due to the fact that the outer end or mouth of the heading cavity 32 will be completely closed by the smashing face of the second punch at the initiation of the heading, during said heading and tubulation all parts of the slug will be completely confined in the die interior, and, as a result, the part of the slug protruded into the heading cavity 32 is so worked on as to prevent flashes or surplus metal from forming on the head, thereby eliminating a trimming operation as aforesaid.

Further in regard to the second and final, or tubulating and heading blow, I believe that the retrograde movement of the die last above referred to, when the invention is carried out by the aid of a double-blow solid-die heading machine equipped or modified as hereinabove detailed, causes an action which will now be explained:

During the delivery of the blow by the second punch 47, during which delivery as aforesaid the knock-out tool 39 is held fast in the position shown in Figs. 4 to 7, the first thing that happens is that the face of said punch contacts the outer end of the slug, and after this occurs the entirety of the slug becomes wholly enclosed in the interior of the die. As the punch continues to advance and the slug starts to bulge girth-wisely, the die 29 retracts, the backing springs 37 for said die compressing, this retraction of the die being due to the friction between the flowing material of the slug and the sides of the die. Consequently the die recedes in its carrier 33 until the rear end of the die abuts the backing 38. During this receding movement of the die the material of the slug is being moved therewith, due to the friction between the die and the slug established by the blows delivered by the two punches, until the tubulation is practically completely formed.

Subsequent to the compression of the spring 54 which backs the punch 47 the working stroke of the punch commences, so far as are concerned a finishing of the tubulation, and the heading operation; since at this instant the punch structure is all up solid.

To explain this further: During the first part of the advance of punch 47, and up until contact of the smashing face thereof with the proximate end of the slug, the spring 54 which backs the punch is holding its said face to extreme forward protrusion. The working stroke of the second punch takes place in timed relation to such die recession, and after the spring 54 is compressed, the rear end of the punch then abutting the backing plate 55. In other words, if Fig. 6 be taken as drawn to full scale, such working stroke is only about ⅛"; that is, when the abutment last referred to occurs, the heading has not yet been completed and the face of the carrier 46 for the punch 47 is about ⅛" distant from the face of the die.

After the completion by punch 47 of its full forward stroke, and during retraction thereof, the knock-out tool 39 advances from its second working position, that of Figs. 3 to 7, all the way to the usual advance or knock-out position of the ordinary knock-out pin, that is, far enough, as shown in Fig. 8, to allow the customary stripper 61 to drop behind the head of the finished article.

On the knock-out tool 39 being next retracted to its first position, that of Fig. 1, by ordinary operation of the machine, said finished article is automatically stripped in the usual may by positive back action of the knock-out tool.

When the product finished as shown in Figs. 7 and 8 is desired to be made into a clincher nut having a D-head, this is done according to the invention, as below described.

Fig. 9 shows the nut blank, marked 28a, after being placed in a suitable seat in the bed 62 of a punch press, and after the working stroke and subsequent retraction of a ram 63 carrying a punch 64 and a shear-blade 65. The tubulation 28b has now been continued as a punched-out cylindrical hole 28c, while the circular head has been cut, as best shown at 28d in Figs. 10 and 11, to transform the same into a D-head.

Fig. 10 shows this bored and D-headed article 28a transferred to a suitable seat in the bed 66 of a tapping machine, and after the cutting of a thread in the hole 28c by the tap 67.

The making, by cold working as described, of what may be called such a rivet-form blank as that shown at 28 in Fig. 2, as the first step in producing a clincher nut blank as at 28 in Fig. 8, has been found to be highly advantageous, not only in aid of economy, but, for one thing, because the cold-worked tubulation is a perfect centering jig-element for insuring precisely correct hole-establishment by the punch 64, and, for another thing, because providing a perfectly shaped head for the finally completed clincher nut and one of densified metal to allow the application of the tap 67 to give a good, clean, strong thread.

The actuating mechanisms for shifting the knock-out tool 39 to its various positions, and for holding the tool in these positions will now be described in detail. These mechanisms or equivalents constitute a feature of the present invention, and is of importance in providing a proper and satisfactory working of the slug 28 according to the method of the invention.

Referring to Fig. 14, the plunger 56, the purpose of which is to move the knock-out tool 39 from first working position to second working position, and to back up the tool and thrust rod 40 when in these positions, is actuated by a toggle mechanism including a pair of toggle bars 68 and 69. The toggle bar 68 has a cylindrical knuckle 70 engaging a socket in a block 71 carried by the outer end of the plunger 56, said block riding in a recess 72 in the frame 22, and bearing against the walls of said recess so as to be guided thereby. The other end of the toggle bar 68 has a knuckle 73 engaging a socket in the toggle bar 69, which latter is carried by and keyed to a shaft 74 journaled in bearings 75 (see Figs. 13 and 14) mounted on the frame 22.

For the purpose of actuating the toggle bars 68 and 69 so as to move the plunger 56, the toggle bar 69 carries an integral yoke arm 76 in which is slidably mounted a bearing block 77 adjustable by a throw adjusting screw 78 in the conventional manner. The block 77 is pin-connected to a link member 79, the other end of which, see Fig. 1, is connected with a crank arm 80 carried by the jack shaft 53'. This arrangement is such that when the head 45 of the machine is in raised position so that the second punch 47 is in alignment with the die 29 preparatory to striking the heading blow, the plunger 56 will be in its advanced position so that the knock-out tool 39 will be in second working position, in readiness for the heading blow.

As shown in Fig. 14, the plunger 56 and forming pin 39 are in retracted position, or first working position. This is the position, corresponding to Fig. 3, wherein the slug 28 is initially formed by the blow of the first punch 30. It will be noted that the working forces which are present during this initial forming of the slug 28 are of lesser magnitude than the forces present during the tubulation and heading of said slug. The position of the toggle mechanism in Fig. 14 is substantially close to dead center, and said position, in relation to the position of the block 77 and link 79 referred to the shaft 74, is such that the force transmitted through the toggle connection is divided manifold in being transmitted through the link member 79. In other words, advantage is taken of the leverage ratios of the link 79 and bar 68 about the shaft 74, so that whereas the toggle bars 68 and 69 are of sturdy construction, the link member 79 can be of relatively lighter construction. This is also satisfactory for the second working position of the knock-out tool, for when the plunger 56 and tool 39 have been advanced to said second position by the toggle bars 68 and 69, the toggle will be substantially in dead center position, which position is that best adapted to withstand the relatively heavy working stresses attending tubulation and heading of the slug 28, and which position imposes little if any stress on link 79.

Adjustment of the advance mechanism as thus described is effected by turning of the throw adjusting screw 78, which is locked in position by a suitable locking nut as shown.

The mechanism for advancing the thrust rod 40 and knock-out tool 39 independently of the plunger 56 to the stripping position shown in Fig. 8, and for returning said rod and tool to fully retracted position, is separate from the toggle mechanism just described for actuating the plunger 56, and is shown in detail in Fig. 15, and also in Fig. 13.

The thrust rod 40 is operatively connected with the lever 43, which latter is pivotally carried on the frame 22 of the machine and is in turn actuated by a slide 81 connected by a stud 82 to a second slide 83. The slide 83 is in turn connected by a link member 84 to a block 85 riding in a yoke arm 86 and adjustable therein by means of a throw adjusting screw 87. The yoke arm 86 is movably carried on the jack shaft 53' of the machine, and said arm carries a cam roller 89 and also a bottom depending arm 90 carrying a second cam roller 91. The roller 89 is adapted to engage and be actuated by a cam 92 having a nose 93, and the roller 91 is adapted to engage and be actuated by a cam 94 having a nose 95, both of said cams being carried by the cam shaft 96 of the machine. The shaft 96 is driven by means of spur gear 97 carried at its other end, and engaging a spur gear 98 on the main or crank shaft 99 of the machine.

It will be seen that, with the cam shaft turning as indicated by the arrow, when the nose 93 of the cam 92 engages the cam roller 89 it will cause counter-clockwise movement of the cam roller carrier about the jack shaft 53' which will in turn effect advance of the knock-out tool 39 to stripping position. Also, following this operation, the nose 95 of the cam 94 will engage the cam roller 91, causing clockwise movement of the cam roller carrier so as to effect return of the knock-out tool to fully retracted position. This mechanism for actuating the knock-out tool 39 for stripping and for returning said tool to fully retracted position is timed with respect to the toggle actuating mechanism for the plunger 56 so that said plunger is in fully retracted position when the cam 94 is effecting return of the knock-out tool to its retracted position.

For the purpose of continually yieldingly urging the thrust rod 40 against the plunger 56, the arm 90 of the cam roller carrier is provided with a helical tension spring 100 urging said carrier in a clockwise direction, said spring being attached to the frame 22 of the machine at 101.

The cutting mechanism of the machine is as follows: The cutter slide 27, see Fig. 13, carries a pin 102 riding in a track or guide way 103 in a cam slide 104 connected by a link 105 with a crank plate (not shown) carried by the cam shaft 96. By these means the cutter 26 is periodically actuated to sever a slug from the stock 20 during the time that the head is being retracted from the die bed after the stripping of a preceding slug in the die 29, and to carry the severed slug into aligning position (as in Fig. 2) with the first punch 30, preparatory to advance of said punch.

Variations and modifications may be made within the scope of this invention, portions of the improvements may be used without others, and like articles to clincher nuts or clincher nut blanks, as well as such nuts and blanks, come within the invention.

I claim:

1. The method of making a clincher nut or the like, which involves simultaneously heading and partially tubulating a slug; then chopping off a segment of the head and punching a cylindrical hole substantially coaxial with said tubulation; and finally threading the cylindrical hole formed by the tubulation and punching.

2. The method of making a clincher nut or the like, which involves simultaneously heading and partially tubulating a slug to give the same a tubulation diminishing in cross-sectional area in the direction of depth of the tubulation lengthwisely of the slug; then chopping off a portion of the head to incorporate in the same a keying element and punching a tappable hole in extension of said tubulation; and finally threading said hole.

3. The method of making a clincher nut blank or the like, which involves inserting a slug into a portion of a die shaped to receive said slug slidably; compressing the slug lengthwisely thereof to expand the slug laterally and sufficiently to set up a predetermined frictional grip by said portion of the die on the slug girthwisely thereof; partially protruding the slug from said portion of the die; and heading over the protruding portion of the slug and simultaneously relatively moving the die and a tubulating tool to draw a tubulation on the end of the slug opposite to its end being headed.

4. The method of making a clincher nut blank or the like, which involves severing an elongate slug from elongate stock; transferring said slug laterally of the face of a die and into alignment with a main cavity in the die, said die having at its face a heading cavity forming an enlarged continuation of said main cavity, said main cavity being of a size to slidably endwisely receive said slug; shifting the slug endwisely to insert the entirety of the length thereof in said main cavity; compressing the slug lengthwisely to cause the same to be girthwisely frictionally gripped by the die; shifting the slug endwisely in a direction to protrude a part of the length thereof into said main cavity; moving the die in the opposite direction and relative to a tubulating tool and applying endwise pressure to the slug to cause that part of the slug in said main cavity to be tubulated; reshaping that part of the slug in said heading cavity, to form entirely within said cavity a head on the slug; and ejecting the slug from the die by endwisely shifting the same toward and through the heading cavity.

5. The method of making a clincher nut blank or the like, which involves endwisely inserting a slug into a portion of a die shaped for the slidable reception of the entirety of the length of the slug; compressing the slug endwisely thereof to expand the slug laterally to wedge the same frictionally in said portion to the extent next below stated; shifting the slug endwisely of said portion and in a direction to partially protrude the slug from said portion, the frictional engagement between the slug and the die set up by such wedging having been sufficient to predetermine that now the slug as thus partially protruded will still be frictionally seized by said portion; and shifting the die endwisely in the opposite direction and relative to a tubulating tool in rear of the face of the die but directed toward said face, thereby to aid in drawing the end of the slug still within the die over said tool to tubulate that end of the slug.

6. The method defined in claim 5, wherein following the initiation of such tubulation the part of the slug protruding beyond die confinement in said die portion is headed over, such heading over being substantially wholly performed while the slug part last mentioned is completely housed in a closed chamber.

7. The method defined in claim 5, wherein said compression of the slug is performed by striking a first blow thereon with said tool in one position in the die and said tubulation is performed by striking a second blow on the slug with said tool in an advanced position in the die, these blows being both directed in one direction, and wherein said shifting of the slug is performed by a push thereon resulting from moving said tool from its first mentioned position to its said advanced position.

8. In a heading machine, in combination, a die having at its face a heading cavity and in rearward continuation thereof a main cavity of less cross-sectional area than said heading cavity but of sufficient size to slidably receive an elongate slug endwisely inserted therein; means for endwisely advancing said slug through said heading cavity and thence into said main cavity to house substantially the entirety of the length of said slug in said main cavity; a tubulating tool disposed in the rear end of said main cavity and movable therein from a rear position to an advanced position, the slug-advancing means including a first punch for striking a first blow against the outer end of the slug to compress the same lengthwisely between said punch and said tool when in its said rear position, thereby to cause the slug to be girthwisely frictionally gripped by said main cavity; and a second punch for tubulating the inner end of the slug and heading the outer end thereof, said second punch striking a second blow against the outer end of the slug after endwise shifting of the slug in said main cavity to protrude the outer end portion of the slug beyond said main cavity and into said heading cavity and after movement of said tool to its advanced position.

9. The heading machine defined in claim 8, wherein said second punch is adapted to fit within said heading cavity and said endwise shifting of the slug is such that substantially at the initiation of the heading operation on the slug the outer end of the heading cavity is completely closed by the second punch.

10. The heading machine defined in claim 8, wherein means are provided, including a second punch, for causing the die to recede, during the blow of said second punch, thereby to draw the metal at the rear end of the slug over the tubulating tool to form a tubulation in the end of the slug confined in said main cavity.

11. In a heading machine, in combination, a die bed; a die thereon having a main cavity for slidably receiving a slug and also having a heading cavity the mouth of which is at the face of the die; a knock-out pin disposed in said main cavity and shaped at its forward end into a tubulation former, said pin being movable from a rear position to an advanced tubulation position and thence to a further advanced knock-out position; a yieldable backing for said die; means for lengthwisely compressing the slug while in said main cavity, such means including said pin in its rear position and a first punch; a punch-head carrying said first punch; and a second punch carried by said head, said head being movable to align either the first punch or the second punch with the die, and said head being movable toward the die to cause said first punch to coact in compressing the slug as aforesaid, and also movable toward the die when said pin is in said tubulating position and when said second punch is aligned with the die, thereby to tubulate the slug incidental to yield of said backing.

12. The machine defined in claim 11, wherein when said pin is moved to tubulating position the slug is endwisely shifted in said main cavity to protrude a length of the slug into said heading cavity, whereby said second punch, shaped to enter said main cavity, heads the slug therein following recession of the die as aforesaid.

13. The machine defined in claim 11, wherein when said pin is moved to tubulating position the slug is endwisely shifted in said main cavity to protrude the major part of the length of the slug into said heading cavity, and wherein means are provided so timing the movement of said tool, from its rear position to its said tubulating position, and a retraction of the first punch, that said tool, said punch and the compressed slug interposed therebetween move as one unit during shifting of the slug as aforesaid.

14. In a heading machine, a die bed; a gate movable toward and away from the bed; a head carried by the gate and movable laterally thereof; a die having a stepped bore with large and small portions, carried by the bed so that the larger portion of the bore is facing the head; means for severing a slug from a continuous supply of metallic stock, and for carrying the severed slug to position in front of the die; means including a punch carried by the head, for transferring the positioned slug into the small portion of the die bore and for spreading the slug girthwisely in said portion so that the walls of the die frictionally engage the slug; means including a tabulating tool for advancing the thus-engaged slug partially out of the smaller bore portion of the die into the larger bore portion; and a second punch carried by the head for forming the thus advanced slug to tubulate the same where confined in the smaller bore portion and against said tool and so that the material thereof flows into and occupies the larger portion of the die bore directly adjacent the smaller portion of the bore.

15. In a double-blow header machine, the combination, with the die bed and the punch head, and with the means for reciprocating said head to move first one punch and then another punch on said head into the die interior, and with the knock-out pin and the means for reciprocating the knock-out pin in the die, and with the means for holding said tool in fully retracted position during a striking of a first blow on a slug in front of said pin by the movement of one of said punches into the die,—of slug-tubulating means carried by said pin at its forward end to constitute said pin a tubulating tool; and means for holding said tool in a position of advance intermediate the length of its forward stroke and for maintaining said tool in that position during the striking of the second blow on said slug by a movement of the other punch into the die, said die having a main cavity and beyond the same a larger heading cavity, and said first punch fitting said main cavity and said second punch fitting said heading cavity, said intermediate position of said tool being such as to protrude the outer end of the slug into said heading cavity, there also being means for holding said tool during the striking of the first blow on the slug at a position such that the slug is confined over substantially its entire length in the main cavity of the die thereby to expand the slug laterally to cause the same to be frictionally seized by the die, and there being yieldable die-positioning means for permitting the die to move rearwardly during the striking of the second blow on the slug, whereby simultaneously with the heading of the outer end of the slug, the inner end thereof is tubulated by a relative movement between the slug and the forward end of the tool, such relative movement resulting from the yielding of said positioning means caused by the striking of the second blow on the slug and from the frictional seizure of the slug by the die.

16. In a heading machine, a die having at its face a heading cavity and in rearward continuation thereof a main cavity of less cross-sectional area than said heading cavity; a forming pin shaped to provide a tubulating tool adapted to slidably fit into the main cavity and engage a slug when in said cavity; means for positioning the pin within the die in either a retracted position or an advanced heading position and for backing the pin to withstand working pressures on the pin when in either position thereof, said means including an advance mechanism for moving the pin and slug from retracted to heading position; means for driving a slug into the main cavity during the retracted position of the pin and against the latter so as to cause the slug to bulge and frictionally engage the walls of the die; and means, including a punch adapted to substantially fit the heading cavity of the die and operating while the forming pin and slug are in heading position, for causing the material at the outer end of the bulged slug to flow into the heading cavity and for tubulating the inner end of the slug by causing the slug material at such end to flow against the tubulating tool.

17. In a heading machine, a die having at its face a heading cavity and in rearward continuation thereof a main cavity of less cross-sectional area than said heading cavity; a forming pin shaped to provide a tubulating tool adapted to slidably fit into the main cavity and engage a slug when in said cavity; means for positioning the pin within the die in either a retracted position or an advanced heading position and for backing the pin to withstand working pressures on the pin when in either position thereof so that said pressures will not move the latter, including an advance mechanism for moving the pin and slug from retracted to heading position; means for driving a slug into the main cavity during the retracted position of the pin and against the latter so as to cause the slug to bulge and frictionally engage the walls of the die; means, including a punch adapted to substantially fit the heading cavity of the die and operating while the forming pin and slug are in heading position, for causing the material at the outer end of the bulged slug to flow into the heading cavity and for tubulating the inner end of the slug by causing the slug material at such end to flow against the tubulating tool; and means for moving the thus-formed slug out of the main and heading cavities of the die.

18. In a heading machine, a die having at its face a heading cavity and in rearward continuation thereof a main cavity of less cross-sectional area than said heading cavity; a forming pin shaped to provide a tubulating tool adapted to slidably fit into the main cavity and engage a slug when in said cavity; means for positioning the pin within the die in either a retracted position or an advanced heading position and for backing the pin to withstand working pressures on the pin when in either position thereof so that said pressures will not move the latter, including an advance mechanism for moving the pin and slug from retracted to heading position; means for driving a slug into the main cavity during the retracted position of the pin and against the latter so as to cause the slug to bulge and frictionally engage the walls of the die; means, including a punch adapted to substantially fit the heading cavity of the die and operating while the forming pin and slug are in heading position, for causing the material at the outer end of the bulged slug to flow into the heading cavity and for tubulating the inner end of the slug by causing the slug material at such end to flow against the tubulating tool; and means for further advancing the forming pin and the thus-formed slug to a stripping position wherein the slug is out of the die; a stripper for engaging the ejected slug; and means for retractively moving the forming pin from its stripping position so that the slug is positively stripped from the pin.

19. The method of making a clincher nut blank or the like, which involves inserting a slug into a portion of a die shaped to receive said slug slidably; applying pressure to the ends of the slug to produce firm frictional engagement between the slug and said portion of the die; partially protruding the slug from said portion of the die; and heading over the protruded portion of the slug and simultaneously moving the die relative to a tubulating tool to draw a tubulation on the other end of the slug.

20. The method defined in claim 5, wherein during such tubulation the part of the slug protruding beyond die confinement in said die portion is headed over.

21. The method defined in claim 5, wherein said compression of the slug is performed by striking a blow against the outer end of the slug, and said tubulation and heading are performed by striking a second blow against said end of the slug.

22. The invention as defined in claim 14, in which the smaller portion of the die bore is of uniform cross-section throughout its length.

23. The invention as defined in claim 14, in which the larger portion of the die bore is of uniform cross-section throughout its length, and in which the second punch substantially fits said bore portion.

24. The method of making a clincher nut blank or the like, which involves giving a preliminary and a minor tubulation to one end portion of the slug, by a cold working, this working being performed while confining the entire length of the slug girthwisely thereof; shifting the slug in a direction substantially normal to its girth; and giving a further and a major tubulation to the first-mentioned end portion of the slug and simultaneously heading the opposite end of the slug, by a second cold working.

ALBERT H. GAESS.